(12) United States Patent
Mallet

(10) Patent No.: US 8,565,994 B2
(45) Date of Patent: Oct. 22, 2013

(54) HILL START ASSISTANCE METHOD AND ASSOCIATED DEVICE

(75) Inventor: Mickael Mallet, Montigny-le-Bretonneux (FR)

(73) Assignee: Renault s.a.s., Boulogne-Billancourt (FR)

( * ) Notice: Subject to any disclaimer, the term of this patent is extended or adjusted under 35 U.S.C. 154(b) by 268 days.

(21) Appl. No.: 12/596,307

(22) PCT Filed: Apr. 2, 2008

(86) PCT No.: PCT/FR2008/050583
§ 371 (c)(1),
(2), (4) Date: Jan. 15, 2010

(87) PCT Pub. No.: WO2008/145876
PCT Pub. Date: Dec. 4, 2008

(65) Prior Publication Data
US 2010/0138124 A1 Jun. 3, 2010

(30) Foreign Application Priority Data
Apr. 19, 2007 (FR) .................................. 07 54565

(51) Int. Cl.
*G06G 7/00* (2006.01)
(52) U.S. Cl.
USPC ......... 701/70; 701/1; 701/67; 477/40; 477/92
(58) Field of Classification Search
USPC ................................ 701/70, 1, 67; 477/74, 92
See application file for complete search history.

(56) References Cited

U.S. PATENT DOCUMENTS

| | | | | |
|---|---|---|---|---|
| 5,820,515 A * | 10/1998 | Fukaya et al. | ................... | 477/92 |
| 6,411,881 B1 * | 6/2002 | Thomas | ........................... | 701/67 |
| 6,547,344 B2 * | 4/2003 | Hada et al. | ..................... | 303/191 |
| 2002/0029943 A1 * | 3/2002 | Totsuka et al. | ................ | 188/113 |
| 2005/0001481 A1 * | 1/2005 | Kley et al. | ..................... | 303/191 |
| 2006/0079377 A1 * | 4/2006 | Steen et al. | ..................... | 477/186 |
| 2008/0262691 A1 * | 10/2008 | Ludwig et al. | .................. | 701/79 |

FOREIGN PATENT DOCUMENTS

| | | |
|---|---|---|
| DE | 101 51 846 | 5/2002 |
| DE | 101 54 633 | 5/2003 |
| DE | 10 2004 060 255 | 7/2005 |
| WO | 01 58714 | 8/2001 |

* cited by examiner

*Primary Examiner* — Mary Cheung
*Assistant Examiner* — Truc M Do
(74) *Attorney, Agent, or Firm* — Oblon, Spivak, McClelland, Maier & Neustadt, L.L.P.

(57) ABSTRACT

A hill start assistance method for a vehicle held in a stationary position by a braking system supplying a braking pressure, the braking system connected to a master cylinder controlled by a pressure transmitted by a user via a brake pedal. The method includes, upon detection of the release of pressure from the brake pedal by a pressure sensor: triggering a time-out; calculating a minimum pressure for holding the vehicle in a stationary position; and adjusting the braking pressure using the braking system such as to reduce the braking pressure in the braking system progressively. The system acts as a pressure regulator, and at the end of the time-out at the latest, the braking pressure is equal to a target pressure that is at least equal to the minimum pressure for holding the vehicle stationary.

15 Claims, 2 Drawing Sheets

HILL START ASSISTANCE METHOD AND ASSOCIATED DEVICE

TECHNICAL FIELD

Figure 1:
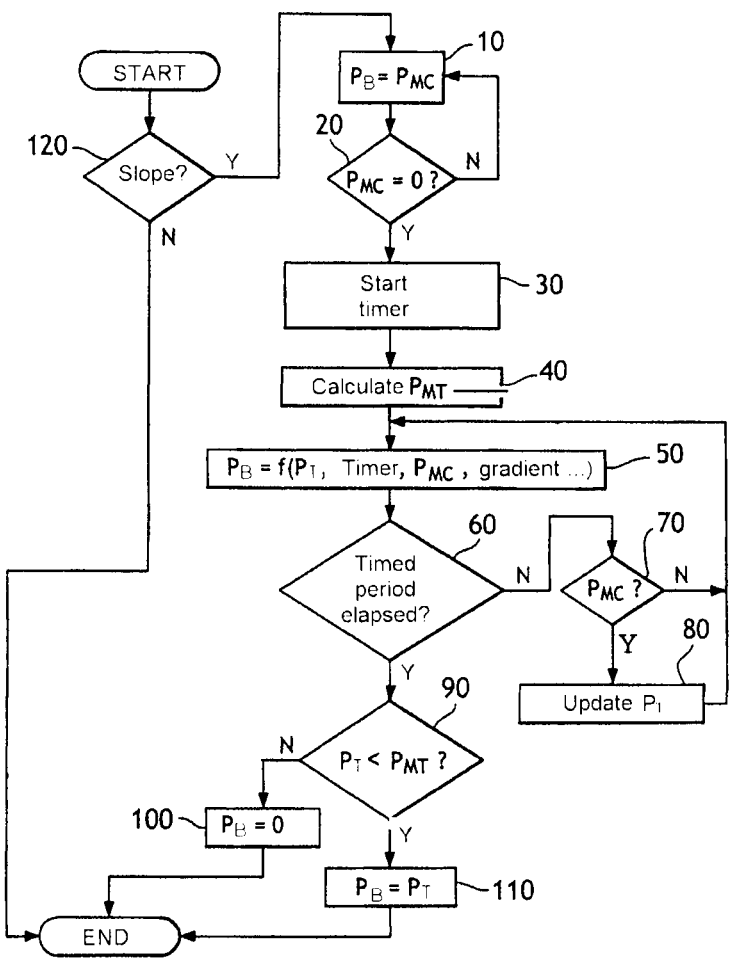

The invention relates to a start assistance method, particularly for a vehicle.

In particular, it relates to an improvement in a hill start assistance system (the English abbreviation HSA which stands for "Hill Start Assistant" is commonly used).

In present-day vehicles, hill starts are a source of stress for the driver who is trying as far as possible to limit the extent to which the vehicle runs back during such a start.

In general, the driver transfers his foot from the brake pedal to the accelerator pedal as quickly as possible in order to be able to start.

Solutions that avoid this source of stress are known.

These solutions prevent the vehicle from rolling back by using the braking system. However, it is appropriate that the vehicle be released at the correct moment.

Devices of the HSA type make it possible, as the driver releases the brake pedal, to maintain the pressure in the braking system for a timed period typically lasting two seconds.

However, the driver must have allowed the brake pedal to spring back far enough to start the timer.

In some solutions, the HSA device records the highest pressure applied by the driver by means of a brake pedal to a master cylinder connected to the braking system of the vehicle and maintains this pressure in the braking system so that the vehicle is maintained in a stationary position.

However, if the driver applies a very high pressure and then rests his foot on the brake pedal (pressing slightly) at the end of the timed period, the pressure in the braking system is released violently, particularly toward the master cylinder, to release the vehicle.

This may lead to an impaired feel by the driver at the brake pedal.

INTRODUCTION TO THE INVENTION

The invention proposes to remedy the aforementioned problems by proposing, in a first aspect, a hill start assistance method for a vehicle in a stationary position by means of a braking system delivering a braking pressure, said braking system being connected to a master cylinder, driven by a pressure transmitted by a user by means of a brake pedal.

The method further comprises, after a pressure sensor has detected that the pressure of the brake pedal has been released, the following successive steps:
the starting of a timer,
the calculation of a minimum maintaining pressure for maintaining the vehicle in a stationary position,
the regulating of the braking pressure by means of the braking system, so as, at the latest at the end of the timed period, the braking pressure is equal to a target pressure at least equal to the minimum maintaining pressure maintaining the vehicle in a stationary position.

Other aspects of the method are as follows:
the regulating of the braking pressure consists in progressively decreasing the braking pressure in the braking system, said system acting as a pressure regulator;
the target pressure is equal to the minimum maintaining pressure;
during the regulating of the braking pressure, if a pressure applied by the user is detected as being lower than the minimum maintaining pressure, then the target pressure is updated to the pressure applied by the user;
at the end of the timed period, the braking pressure in the braking system is released;
the timed period lasts for two seconds;
the regulating (50) of the braking pressure follows a linear decrease;
the regulation is a linear function of at least the applied braking pressure, the minimum maintaining pressure, and the length of the timed period;
the minimum maintaining pressure for maintaining the vehicle in a stationary position is at least a function of the slope, of the engine speed, of the type of gear ratio engaged.

According to a second aspect, the invention also proposes a hill start assistance device comprising means capable of implementing a hill start assistance method according to the first aspect of the invention.

INTRODUCTION TO THE FIGURES

Figure 2:
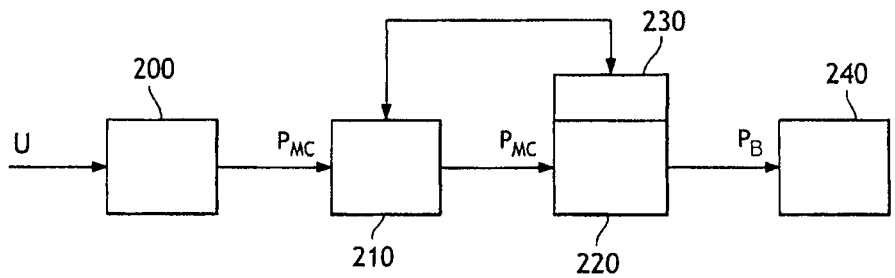
Figure 3:
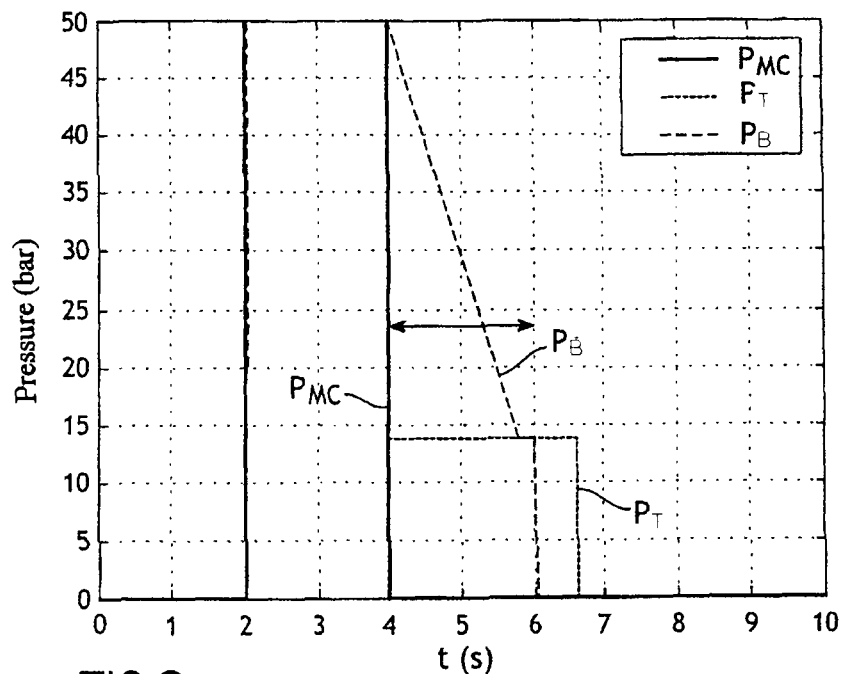
Figure 4:
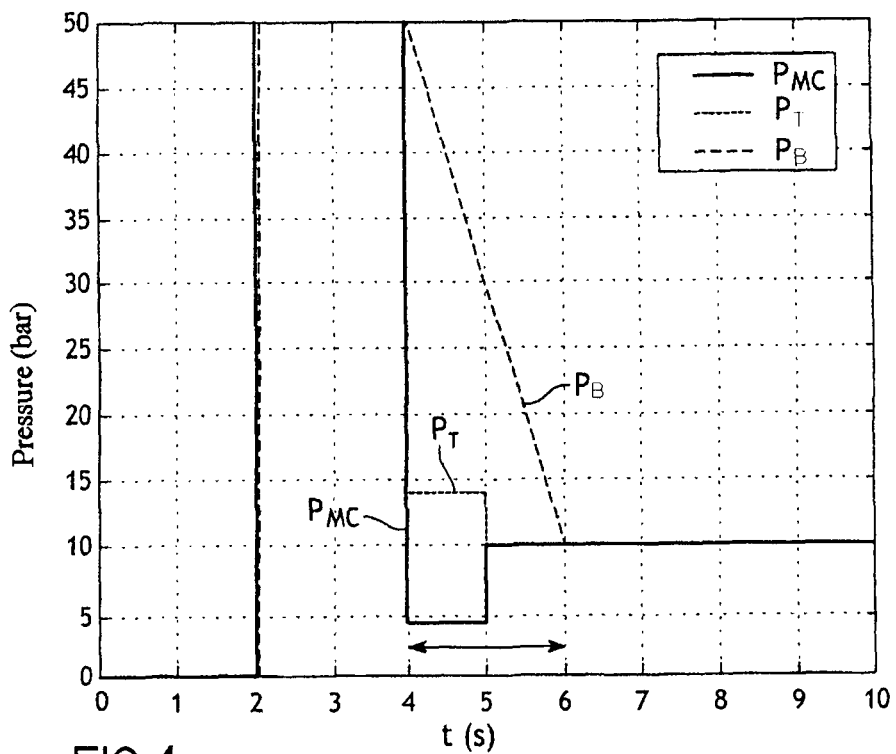

Other features and advantages of the invention will become more apparent from the description which follows, which is purely illustrative and nonlimiting and is to be read in conjunction with the attached drawings in which:

FIG. 1 is a flow diagram of the method of the invention,

FIG. 2 schematically illustrates the braking system into which the method is incorporated, FIG. 3 illustrates the variations in the parameters of the method according to a first embodiment, FIG. 4 illustrates the variations in the parameters of the method according to a second embodiment.

DESCRIPTION OF THE INVENTION

FIG. 1 illustrates a flow diagram of the hill start assistance method of the invention.

FIG. 2 schematically illustrates the architecture of the braking system around which the method is built.

The method of the invention is incorporated into an overall system the hardware architecture of which comprises a hydraulic braking system (220) of the known ESP (this abbreviation for the English expression "Electronic Stability Program" is commonly used for dynamic stability control) type which makes it possible to influence the pressures at each caliper 240 and which is equipped with at least a master cylinder pressure sensor 230, a module for measuring the gradient of the slope, the engine speed, the wheel speed, the positions of the accelerator and clutch pedals, information regarding the type of gear ratio engaged (forward gear, reverse gear, neutral) and one or more electronic calculation means.

It will therefore be appreciated that the braking system acts like a pressure regulator.

As known per se, the hill start assistant comes into operation when, on the one hand, the vehicle is in a stationary position and, on the other hand, the braking system 250 has detected 120 that the vehicle is actually in a stationary position on a hill.

The method allows the vehicle to be maintained in a stationary position by means of a braking system 220 delivering a braking pressure $P_B$.

The braking system 220 is connected to a master cylinder 210, driven by a pressure $P_{MC}$ transmitted by a driver U by means of a brake pedal 200.

The pressure $P_B$ is communicated to the brake calipers 240 that immobilize the wheels of the vehicle.

Furthermore, the method requires knowledge of the gradient of the slope, of the engine speed, of the wheel speeds, of the positions of the accelerator and clutch pedals. It also needs to have information about the type of gear ratio engaged (a forward gear, reverse gear, neutral).

This information is available via the ESP braking system 220.

It should be noted that the stationary position needs to be held for at least a timed period.

The method of the invention uses a master cylinder pressure sensor 230 which will detect 20 the moment at which the driver releases the pressure $P_{MT}$ on the brake pedal 200.

Following this detection 20 a timer 30 is started.

Nonlimitingly, this timer 30 runs for two seconds.

Following the starting 30 of the timer, the method calculates 40 a minimum maintaining pressure $P_{MT}$ for maintaining the vehicle in a stationary position.

This pressure $P_{MT}$ is dependent on the maximum pressure applied by the driver, on the gradient, on the mass of the vehicle and on the characteristics of the braking system.

In other words, the pressure $P_{MT}$ is dependent on instantaneous characteristics of the vehicle at the moment the hill start assistance begins 120.

At this stage, the pressure in the braking circuit $P_B$ is still equal to the pressure $P_{MC}$ applied by the driver to the brake pedal 200 and transmitted to the master cylinder 210.

As already discussed and as known per se, at the end of the timed period the braking pressure will be released and this will cause a violent return of the brake pedal 200, via the master cylinder 210 connected to the brake pedal 200, particularly when the driver U is still applying pressure to the brake pedal 200.

In order to avoid this tiresome aspect, during the timed period, the method will initiate regulation 50 of the braking pressure $P_B$ by means of the braking system, so that, at the latest at the end of the timed period, the braking pressure $P_B$ is equal to a target pressure $P_T$ at minimum equal to the minimum maintaining pressure $P_{MT}$ for maintaining the vehicle in a stationary position.

Thus, on the one hand, during the timed period, the braking pressure will be of necessity higher than the minimum maintaining pressure, thus ensuring that the vehicle is in a stationary position, this being the objective of a hill start assistance device.

Further, on the other hand, the benefit is that, at the latest at the end of the timed period, at the instant preceding brake release, that is to say release of the pressure $P_B$ in the braking circuit 230, this pressure will be low enough to limit, to the strictest minimum, the feedback of the pressure in the master cylinder 210 that is troublesome to the driver because it is detrimental to the pedal feel.

It should be noted that the regulation 50 of the braking pressure $P_B$ consists in progressively decreasing the braking pressure $P_B$ in the braking system 220.

This may in particular be a linear decrease.

This linear decrease may in particular be a linear function of at least the applied braking pressure, the minimum braking pressure, and the length of the timed period.

Furthermore, the target pressure $P_T$ may be equal to the minimum maintaining pressure $P_{MT}$ for maintaining the vehicle in a stationary position.

This is of particular benefit when the driver U reinitiates pressure on the brake pedal 200 during the timed period.

Thus, according to one embodiment variant, during the timed period during the course of which the braking pressure $P_B$ is regulated, the method will detect 70, by means of the master cylinder sensor 220, any pressure by the user on the brake pedal 200.

If this pressure $P_{MC}$ is lower than the calculated 40 vehicle minimum maintaining pressure $P_{MT}$, then the target pressure $P_T$ toward which the braking pressure $P_B$ is progressing will be updated to this new value.

If not, no update takes place in order not adversely to affect the pedal feel experienced by the driver U.

Thus, according to this variant, at the end of the timed period, the braking pressure $P_B$ will be equal to this new value.

FIG. 3 refers to an embodiment when the driver does not reinitiate any pressure during the timed period.

When the driver U releases the pressure on the brake pedal 200, the target pressure $P_T$ adopts the minimum maintaining pressure $P_{MT}$ for maintaining the vehicle in a stationary position.

The braking pressure $P_B$ decreases progressively toward the target pressure. The objective here is to allow a more rapid response when the vehicle is to leave its stationary position.

At the end of the timed period, which lasts for two seconds, the braking pressure $P_B$ is released so that the vehicle can leave its stationary position.

The target pressure value $P_T$ remains at the maintaining value $P_{MT}$ throughout the time taken to release the brakes, and is then reinitialized.

FIG. 4 refers to a second embodiment, particularly when the driver initiates pressure on the pressure pedal during the timed period.

The driver applies the pressure to the master cylinder $P_{MC}$ and immobilizes the vehicle, releases the pressure on the brake pedal and once again applies a light pressure, lower than the minimum maintaining pressure that maintains the vehicle in a stationary position.

As soon as the driver releases the pressure, the target pressure $P_T$ is re-evaluated to the minimum maintaining pressure (which is dependent in particular on the gradient and which in this instance is about 14 bar).

During the period in which the driver is no longer braking, the braking pressure $P_B$ decreases progressively at a parametrizable rate (in this instance 20 bar/s) toward the target pressure $P_T$.

When the driver once again applies a braking pressure, the target pressure $P_T$ is updated to the value $P_{MC}$ applied by the driver and the pressure continues to decrease progressively.

Without this progression, after the 2 seconds of timed period, the pressure was suddenly released, potentially generating a particularly violent force at the pedal.

In particular, according to the method of the invention, the pressure is released in such a way as to reach this pressure progressively so that the force at the pedal changes progressively.

Thus, the method of the invention allows the braking pressure to be released in such a way that if the driver still has his foot on the brake pedal, he feels the variation in pressure under his foot very little if at all.

Furthermore, the pressure in the braking circuit is released without degrading the pressure down to the level required to hold the vehicle on the slope.

Because the pressure is as close as possible to the value needed to maintain the vehicle, this must make it possible to improve the phase during which the vehicle leaves its stationary position by reducing the time taken to release the brake calipers 260 in order to free the wheels of the vehicle.

The invention claimed is:

1. A hill start assistance method for a vehicle in a stationary position on a hill by a braking system delivering a braking pressure, the braking system being connected to a master cylinder, driven by a pressure transmitted by a user by a brake pedal, the method comprising:

determining a first pressure in the braking system transmitted by the brake pedal to maintain the vehicle in the stationary position on the hill;

after a pressure sensor detects that the brake pedal has been released, starting a timer to run for a timed period;

calculating a minimum maintaining pressure for maintaining the vehicle in the stationary position on the hill after the brake pedal has been released; and actively regulating the braking pressure in the braking system by controlling the braking pressure to decrease progressively from the first pressure to the minimum maintaining pressure so that, at an end of the timed period, the braking pressure is equal to a target pressure at least equal to the minimum maintaining pressure maintaining the vehicle in the stationary position on the hill.

2. The method as claimed in claim 1, wherein the target pressure is equal to the minimum maintaining pressure.

3. The method as claimed in claim 1, wherein after the pressure sensor has detected that the brake pedal has been released and during the regulating of the braking pressure, if the user presses the brake pedal such that a new value of the pressure transmitted by the brake pedal is lower than the minimum maintaining pressure, then the target pressure is updated to the new value applied by the user.

4. The method as claimed in claim 1, wherein, at the end of the timed period, the braking pressure in the braking system is released.

5. The method as claimed in claim 1, wherein the timed period lasts for two seconds.

6. The method as claimed in claim 1, wherein the regulating of the braking pressure follows a linear decrease.

7. The method as claimed in claim 6, wherein the regulating is a linear function of at least the applied braking pressure, the minimum maintaining pressure, and a length of the timed period.

8. The method as claimed in claim 1, wherein the minimum maintaining pressure for maintaining the vehicle in the stationary position is at least a function of slope, of engine speed, and of type of gear ratio engaged.

9. The method as claimed in claim 1, wherein the regulating includes beginning the progressive decrease of the braking pressure as soon as the pressure sensor detects that the brake pedal has been released.

10. The method as claimed in claim 3, wherein, at the end of the timed period, the braking pressure in the braking system is released.

11. The method as claimed in claim 1, further comprising:
maintaining the first pressure in the braking system when the user releases the brake pedal.

12. A hill start assistance device of a vehicle on a hill, comprising:
a brake pedal;
a master cylinder configured to receive a pressure applied by a user via the brake pedal;
a braking system including a pressure sensor; and
calipers to brake the vehicle in response to a braking pressure received from the braking system,
wherein the braking system is configured to
determine a first pressure transmitted by the brake pedal to maintain the vehicle in a stationary position on the hill,
start a timer to run for a timed period after the pressure sensor detects that the brake pedal has been released,
calculate a minimum maintaining pressure to maintain the vehicle in the stationary position on the hill, and
actively regulate the braking pressure by controlling the braking pressure to decrease progressively from the first pressure to the minimum maintaining pressure so that, at an end of the timed period, the braking pressure is equal to a target pressure at least equal to the minimum maintaining pressure maintaining the vehicle in the stationary position on the hill.

13. The device as claimed in claim 12, wherein the braking system is configured to regulate the braking pressure to begin the progressive decrease of the braking pressure as soon as the pressure sensor detects that the brake pedal has been released.

14. The device as claimed in claim 12, wherein, at the end of the timed period, the braking pressure in the braking system is released.

15. The device as claimed in claim 12, wherein the braking system is configured to, after the pressure sensor has detected that the brake pedal has been released and during the regulating of the braking pressure, update the target pressure to a new value applied by the user when the user presses the brake pedal such that the new value of the pressure transmitted by the brake pedal is lower than the minimum maintaining pressure.

* * * * *